United States Patent
Baracaldo Angel et al.

(10) Patent No.: US 10,757,058 B2
(45) Date of Patent: Aug. 25, 2020

(54) OUTGOING COMMUNICATION SCAM PREVENTION

(71) Applicant: INTERNATIONAL BUSINESS MACHINES CORPORATION, Armonk, NY (US)

(72) Inventors: Nathalie Baracaldo Angel, San Jose, CA (US); Pawan R. Chowdhary, San Jose, CA (US); Heiko H. Ludwig, San Francisco, CA (US); Robert J. Moore, San Jose, CA (US); Amir J. Safavi, Berkeley, CA (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/436,365

(22) Filed: Feb. 17, 2017

(65) Prior Publication Data
US 2018/0241647 A1    Aug. 23, 2018

(51) Int. Cl.
*G06F 15/173* (2006.01)
*H04L 12/58* (2006.01)
*H04L 29/06* (2006.01)

(52) U.S. Cl.
CPC .............. *H04L 51/22* (2013.01); *H04L 51/12* (2013.01); *H04L 63/00* (2013.01); *H04L 63/1416* (2013.01); *H04L 63/1441* (2013.01)

(58) Field of Classification Search
CPC ............................... H04L 47/31; H04L 51/22
USPC ......................................... 709/206, 223, 224
See application file for complete search history.

(56) References Cited

U.S. PATENT DOCUMENTS

| | | | |
|---|---|---|---|
| 6,246,672 B1 | 6/2001 | Lumelsky | |
| 6,604,077 B2 | 8/2003 | Daragosh et al. | |
| 6,611,537 B1 | 8/2003 | Edens et al. | |
| 6,700,963 B1 | 3/2004 | Jordan | |
| 7,242,752 B2 | 7/2007 | Chiu | |
| 7,382,867 B2 | 6/2008 | Smith et al. | |
| 7,540,021 B2 | 5/2009 | Page | |
| 7,933,399 B2 | 4/2011 | Knott et al. | |
| 8,292,433 B2 | 10/2012 | Vertegaal et al. | |
| 8,340,975 B1 | 12/2012 | Rosenberger et al. | |

(Continued)

FOREIGN PATENT DOCUMENTS

| | | |
|---|---|---|
| CN | 102571487 A | 7/2012 |
| CN | 105187367 | 12/2015 |
| IN | 201641021969 | 7/2016 |

OTHER PUBLICATIONS

List of IBM Patents or Patent Applications Treated As Related.
(Continued)

*Primary Examiner* — Liang Che A Wang
(74) *Attorney, Agent, or Firm* — Sherman IP LLP; Kenneth L. Sherman; Hemavathy Perumal

(57) ABSTRACT

One embodiment provides a method comprising intercepting an incoming communication for a user, and determining whether to classify the incoming communication as a suspicious incoming communication based on content of the incoming communication and a learned classification model or learned signatures. The method further comprises monitoring one or more outgoing communications from the user, and invoking an action relating to scam prevention in response to determining an outgoing communication from the user is linked to a suspicious incoming communication.

20 Claims, 5 Drawing Sheets

(56) References Cited

U.S. PATENT DOCUMENTS

| | | | |
|---|---|---|---|
| 8,411,833 B2 | 4/2013 | Dolan et al. | |
| 8,537,996 B2 | 9/2013 | Takeyama et al. | |
| 8,565,396 B1* | 10/2013 | Oliver | H04M 1/663 379/114.14 |
| 8,761,353 B1 | 6/2014 | Apple et al. | |
| 8,769,671 B2 | 7/2014 | Shraim et al. | |
| 8,863,244 B2 | 10/2014 | Bono et al. | |
| 8,925,095 B2 | 12/2014 | Herz et al. | |
| 9,014,359 B1 | 4/2015 | H.L. et al. | |
| 9,075,977 B2 | 7/2015 | Gross | |
| 9,116,877 B2* | 8/2015 | Chandramouli | G06F 17/2785 |
| 9,245,115 B1 | 1/2016 | Jakobsson | |
| 9,262,610 B2 | 2/2016 | Hudack et al. | |
| 9,300,790 B2 | 3/2016 | Gainsboro et al. | |
| 9,332,025 B1* | 5/2016 | Watson | H04L 63/1441 |
| 9,357,362 B2 | 5/2016 | Jin et al. | |
| 9,553,985 B2 | 1/2017 | Cohen et al. | |
| 9,633,674 B2 | 4/2017 | Sinha | |
| 9,665,703 B2 | 5/2017 | Turgeman et al. | |
| 9,667,994 B2 | 5/2017 | Almeida | |
| 9,690,915 B2 | 6/2017 | Turgeman et al. | |
| 9,696,813 B2 | 7/2017 | Chui | |
| 9,712,526 B2 | 7/2017 | Headley et al. | |
| 9,729,727 B1 | 8/2017 | Zhang et al. | |
| 9,843,668 B2 | 12/2017 | Hodge | |
| 10,277,981 B1 | 4/2019 | Frank et al. | |
| 10,299,061 B1 | 5/2019 | Sheen | |
| 10,461,710 B1 | 10/2019 | Charlton et al. | |
| 2003/0187659 A1 | 10/2003 | Cho et al. | |
| 2006/0184632 A1* | 8/2006 | Marino | G06F 21/56 709/206 |
| 2009/0055193 A1 | 2/2009 | Maislos et al. | |
| 2010/0229245 A1 | 9/2010 | Singhal | |
| 2011/0182283 A1 | 7/2011 | Van Buren et al. | |
| 2012/0254333 A1* | 10/2012 | Chandramouli | G06F 17/27 709/206 |
| 2012/0294435 A1 | 11/2012 | Cox et al. | |
| 2013/0046531 A1* | 2/2013 | Chandramouli | G06F 17/2715 704/9 |
| 2013/0198298 A1 | 8/2013 | Li et al. | |
| 2013/0339105 A1 | 12/2013 | Russell et al. | |
| 2014/0122618 A1 | 5/2014 | Duan | |
| 2014/0237599 A1 | 8/2014 | Gertner et al. | |
| 2014/0280933 A1 | 9/2014 | Oswald et al. | |
| 2014/0297282 A1 | 10/2014 | Peters et al. | |
| 2014/0370838 A1 | 12/2014 | Kim et al. | |
| 2015/0039319 A1 | 2/2015 | Mei et al. | |
| 2015/0096020 A1* | 4/2015 | Adams | H04L 67/303 726/23 |
| 2015/0156214 A1 | 6/2015 | Kaminsky et al. | |
| 2015/0195403 A1 | 7/2015 | Goulet et al. | |
| 2015/0288791 A1 | 10/2015 | Weiss et al. | |
| 2016/0005029 A1 | 1/2016 | Ivey et al. | |
| 2016/0046023 A1 | 2/2016 | Nagendran et al. | |
| 2016/0063218 A1* | 3/2016 | Nachenberg | G06F 21/10 726/26 |
| 2016/0065528 A1 | 3/2016 | Weksler et al. | |
| 2016/0142398 A1 | 5/2016 | Lin | |
| 2016/0147992 A1 | 5/2016 | Zhao et al. | |
| 2016/0217790 A1 | 7/2016 | Sharifi et al. | |
| 2016/0309281 A1 | 10/2016 | Lee | |
| 2016/0316057 A1 | 10/2016 | Korn | |
| 2017/0134574 A1 | 5/2017 | Winkler et al. | |
| 2017/0180284 A1 | 6/2017 | Smullen et al. | |
| 2017/0180899 A1 | 6/2017 | Proctor, Jr. et al. | |
| 2017/0236514 A1 | 8/2017 | Nelson | |
| 2017/0251328 A1 | 8/2017 | Klein | |
| 2017/0311341 A1 | 10/2017 | Patil et al. | |
| 2017/0344532 A1 | 11/2017 | Zhou et al. | |
| 2018/0146370 A1 | 5/2018 | Krishnaswamy et al. | |
| 2018/0270290 A1 | 9/2018 | Sinha et al. | |

OTHER PUBLICATIONS

Pindrop Security, "The State of Phone Fraud 2014-2015 A Global, Cross-industry Threat", Sep. 8, 2016, pp. 1-16, White Paper, Pindropsecurity.com, United States.

Anonymous, "Security Control in Mobile Messaging Services", Oct. 23, 2014, pp. 1-2, IP.COM, United States.

Linux Defenders, et al., "Method of Advanced Span Detection and Classification", Mar. 23, 2009, ipCapital Group, Inc., pp. 1-6, IP.COM, United States.

International Business Machines Corporation (IBM), ""Unstable Code" Higher Level Compiler Messages Classification", Aug. 26, 2008, IP.COM, United States.

Andriesse, D. et al., "Highly Resilient Peer-to-Peer Botnets Are Here: An Analysis of Gameover Zeus", Proceedings of the 2013 8th International Conference on Malicious and Unwanted Software: "The Americas" (Malware), Oct. 22-24, 2013, pp. 1-8, IEEE, United States.

Kale, A.R. et al., "An Advanced Hybrid Peer-to-Peer Botnet", international Journal of Wireless Communication, Mar. 15, 2012, pp. 15-19, vol. 2, Issue 1, Bioinfo Publications, United States.

Gruber, M. et al., "Voice Calls for Free: How the Black Market Establishes Free Phone Calls—Trapped and Uncovered by a VoIP Honeynet", Proceedings of the 2013 11th Annual Conference on Privacy, Security and Trust (PST), Jul. 10-12, 2013, pp. 205-212, IEEE, United States.

Tero, P. et al., "Cleverbot Data for Machine Learning", Jan. 2016, pp. 1-17, Existor.com [http://www.existor.com/en/ml-cleverbot-data-for-machine-learning.html], United Kingdom.

List of IBM Patents or Patent Applications Treated As Related; Angel, Nathalie Baracaldo, U.S. Appl. No. 16/455,593, filed Jun. 27, 2019.

List of IBM Patents or Patent Applications Treated As Related; Angel, Nathalie Baracaldo, U.S. Appl. No. 16/592,655, filed Oct. 3, 2019.

List of IBM Patents or Patent Applications Treated As Related; Angel, Baracaldo, N., U.S. Appl. No, 16/917610, filed Jun. 30, 2020.

* cited by examiner

240

| Suspicious Incoming Communication | Risk Assessment Metric | Scam Type |
|---|---|---|
| 412-IRS-SCAM | 0.9 | Tax scam |
| 123 Fraud St, CA 1223 | 0.89 | Fake loan scam |
| scammer@badguy.com | 0.95 | Foreign lottery scam |

241

| Standard Incoming Communication |
|---|
| 412-589-563 |
| 777 Your doctor St, CA 1900 |
| mom@family.com |

400

OUTGOING COMMUNICATION SCAM PREVENTION

The present invention generally relates to scam prevention, and more particularly, to a system and method for outgoing communication scam prevention.

BACKGROUND

Scams are fraud crimes initiated by perpetrators via phone calls, mail, emails, text messages, voice messages, and other incoming communications. Victims of scams may be affected financially and/or emotionally. For example, a victim of a scam is often tricked into providing money, private information, and/or remote access to one or more of their devices to a perpetrator of the scam over the phone or via mail, email, etc. In recent years, hundreds of millions of dollars have been lost due to scams. Scams may affect any demographic and any geographic location.

SUMMARY

One embodiment provides a method comprising intercepting an incoming communication for a user, and determining whether to classify the incoming communication as a suspicious incoming communication based on content of the incoming communication and a learned classification model or learned signatures. The method further comprises monitoring one or more outgoing communications from the user, and invoking an action relating to scam prevention in response to determining an outgoing communication from the user is linked to a suspicious incoming communication.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
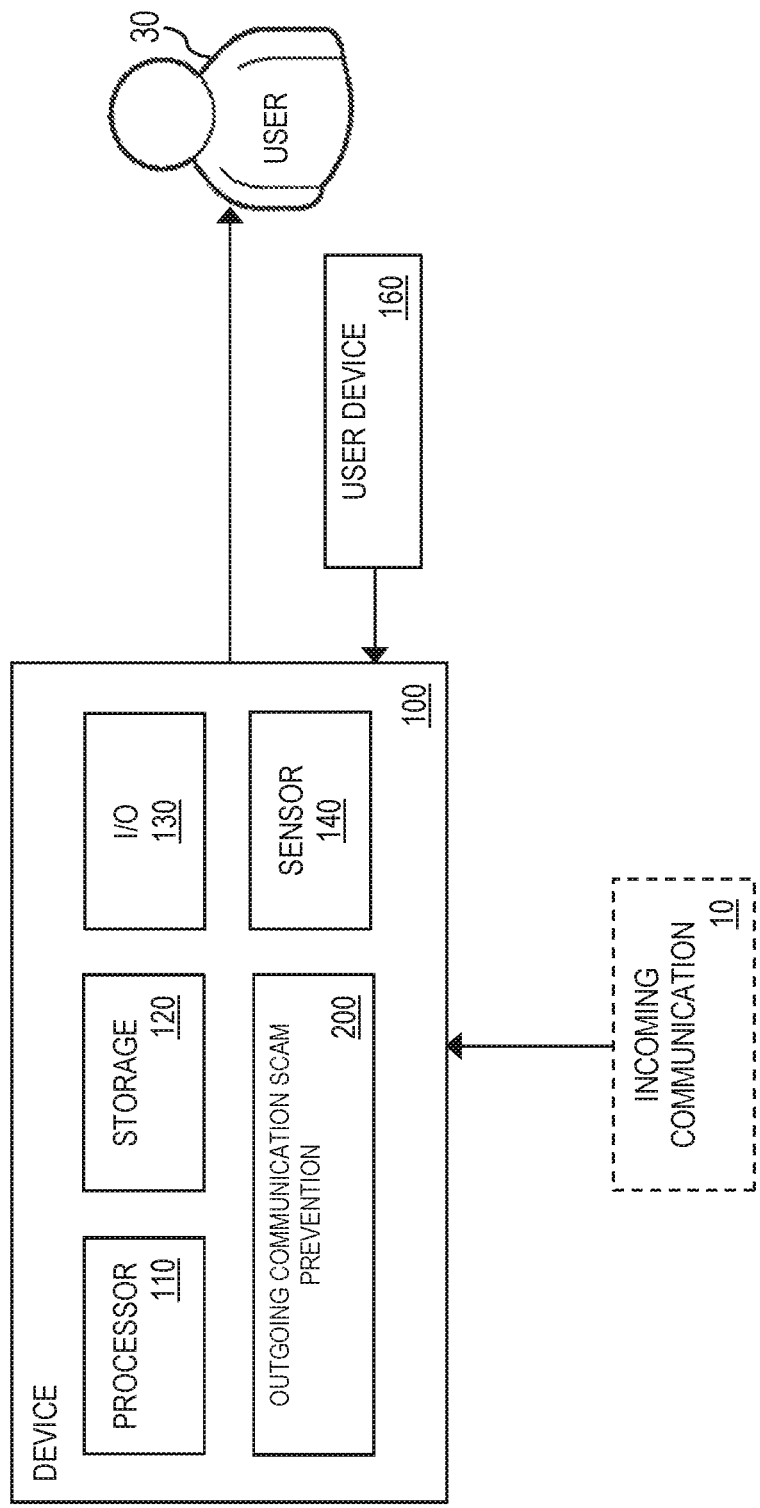
FIG. 1 illustrates an example computer architecture for outgoing communication scam prevention, in accordance with an embodiment of the invention.

The detailed description explains the preferred embodiments of the invention, together with advantages and features, by way of example with reference to the drawings.

DETAILED DESCRIPTION

The present invention generally relates to scam prevention, and more particularly, to a system and method for outgoing communication scam prevention. One embodiment provides a method comprising intercepting an incoming communication for a user, and determining whether to classify the incoming communication as a suspicious incoming communication based on content of the incoming communication and a learned classification model or learned signatures. The method further comprises monitoring one or more outgoing communications from the user, and invoking an action relating to scam prevention in response to determining an outgoing communication from the user is linked to a suspicious incoming communication.

For expository purposes, the term "user" as used herein refers to a possible target of a scam. The terms "user" and "target" may be used interchangeably in the specification.

For expository purposes, the term "scammer" as used herein refers to a perpetrator of a scam.

For expository purposes, the term "incoming communication" as used herein refers to a communication to a user. An incoming communication may or may not originate from a scammer or another individual/entity distributing unsolicited communications. Examples of different types of incoming communication include, but are not limited to, phone calls, voicemails, emails, electronic messages (e.g., (e.g., text messages, electronic chats, instant messages, etc.), physical mail (e.g., letters, postcards, flyers, etc.), or any other type of communication.

For expository purposes, the term "outgoing communication" as used herein refers to a communication from a user. Examples of different types of outgoing communication include, but are not limited to, phone calls, emails, electronic messages (e.g., (e.g., text messages, electronic chats, instant messages, etc.), physical mail (e.g., letters, postcards, flyers, etc.), or any other type of communication.

Scams are difficult to prevent. Scammers carefully craft incoming communications to trick innocent targets into providing private information or money. Such incoming communications often causes a target to send an outgoing communication containing information the target should not reveal (e.g., personal information).

Existing methodologies for scam prevention typically focus on incoming communications for a user. For example, some existing methodologies involve filtering phone numbers based on a collection of suspicious phone numbers. Such numbers are often pulled from a database of blacklisted phone numbers. Existing methodologies do not analyze outgoing communications from the user.

One embodiment provides a framework for outgoing communication scam prevention. The framework is configured to receive an incoming communication and determine if it is a scam. If the framework determines that the incoming communication is a scam, the framework may perform one or more interventions if it detects the user preparing a response to the incoming communication. For example, the framework may delay sending the outgoing communication or inform a third party (e.g., a trusted person of the user, such as a family member).

FIG. 1 illustrates an example computer architecture 50 for outgoing communication scam prevention, in accordance with an embodiment of the invention. The computer architecture 50 comprises an electronic device 100 including computation resources, such as one or more processor units 110 and one or more storage units 120. One or more applications may execute/operate on the device 100 utilizing the computation resources of the device 100. In one embodiment, the applications include, but are not limited to, an outgoing communication scam prevention system 200. As described in detail later herein, the scam prevention system 200 is configured to intercept an incoming communication 10 targeting a user 30, analyze the incoming communication 10 to determine a corresponding risk assessment metric and a corresponding risk classification for the incoming communication 10 (e.g., standard incoming communication, suspicious incoming communication, etc.), and generate a risk report indicative of the risk assessment metric. The risk report is provided to the user 30 for review.

In one embodiment, a risk assessment metric for an incoming communication 10 represents a confidence level the incoming communication 10 is classified as scam. For example, if an incoming communication 10 has a high risk assessment metric, the incoming communication 10 is classified as suspicious incoming communication. By comparison, if an incoming communication 10 has a low risk assessment metric, the incoming communication 10 is classified as standard incoming communication or another generic category (e.g., personal, medical, etc.).

The scam prevention system 200 is further configured to detect when the user 30 is preparing/initiating an outgoing communication responding to an incoming communication 10 classified as suspicious incoming communication. If the scam prevention system 200 detects the user 30 is preparing/initiating an outgoing communication responding to an incoming communication 10 classified as suspicious incoming communication, the scam prevention system 200 is further configured to perform an intervention (e.g., delay the outgoing communication, cancel the outgoing communication, inform a third party, etc.) and/or provide a warning to the user 30 (e.g., remind the user 30 of a risk report previously generated for the incoming communication 10, flash a warning light, play a warning sound/song, etc.).

In one embodiment, the scam prevention system 200 may be used to screen any type of incoming communication targeting the user 30. Examples of different types of incoming communication include, but are not limited to, phone calls, voicemails, emails, electronic messages (e.g., text messages, electronic chats, instant messages, etc.), physical mail such as letters, etc. The scam prevention system 200 may also be used to monitor any type of outgoing communication prepared/initiated by the user 30. Examples of different types of outgoing communication include, but are not limited to, phone calls, emails, electronic messages (e.g., text messages, electronic chats, instant messages, etc.), physical mail such as letters, etc.

The device 100 may be any type of electronic device, such as, but not limited to, a mobile device (e.g., a smart phone, a laptop, a tablet, etc.), a digital telephone, a server connected to a local network, etc.

In one embodiment, the device 100 comprises one or more input/output (I/O) modules 130 integrated in or coupled to the device 100, such as a keyboard, a keypad, a touch interface, a display screen, etc. The user 30 may utilize an I/O module 130 (e.g., a keyboard) to prepare/initiate an outgoing communication. As described in detail later herein, the scam prevention system 200 may provide a warning to an I/O module 130 (e.g., a display screen) in response to detecting the user 30 is preparing/initiating an outgoing communication responding to an incoming communication 10 classified as suspicious incoming communication.

In one embodiment, the device 100 comprises one or more sensor modules 140 integrated in or coupled to the device 100, such as a microphone, GPS, etc. The one or more sensor modules 140 may be utilized to monitor when the user 30 is preparing/initiating an outgoing communication. For example, if the user 30 initiates a phone call responding to an incoming communication 10 classified as suspicious incoming communication, the scam prevention system 200 may utilize a microphone of the device 100 to record the phone call; a recording of the phone call may analyzed in real-time to determine whether the user 30 is speaking with a perpetrator of a scam.

In one embodiment, the device 100 is configured to exchange data with one or more external user devices 160 over a connection (e.g., a wireless connection such as a WiFi connection or a cellular data connection, a wired connection, or a combination of the two). An external user device 160 may any type of electronic device, such as, but not limited to, a mobile device (e.g., a smart phone, a laptop, a tablet, etc.), a desktop computer, etc. The user 30 may utilize an external user device 160 to prepare/initiate an outgoing communication. As described in detail later herein, the scam prevention system 200 may provide a warning to an external user device 160 in response to detecting the user 30 is preparing/initiating an outgoing communication responding to an incoming communication 10 classified as suspicious incoming communication.

Figure 2:
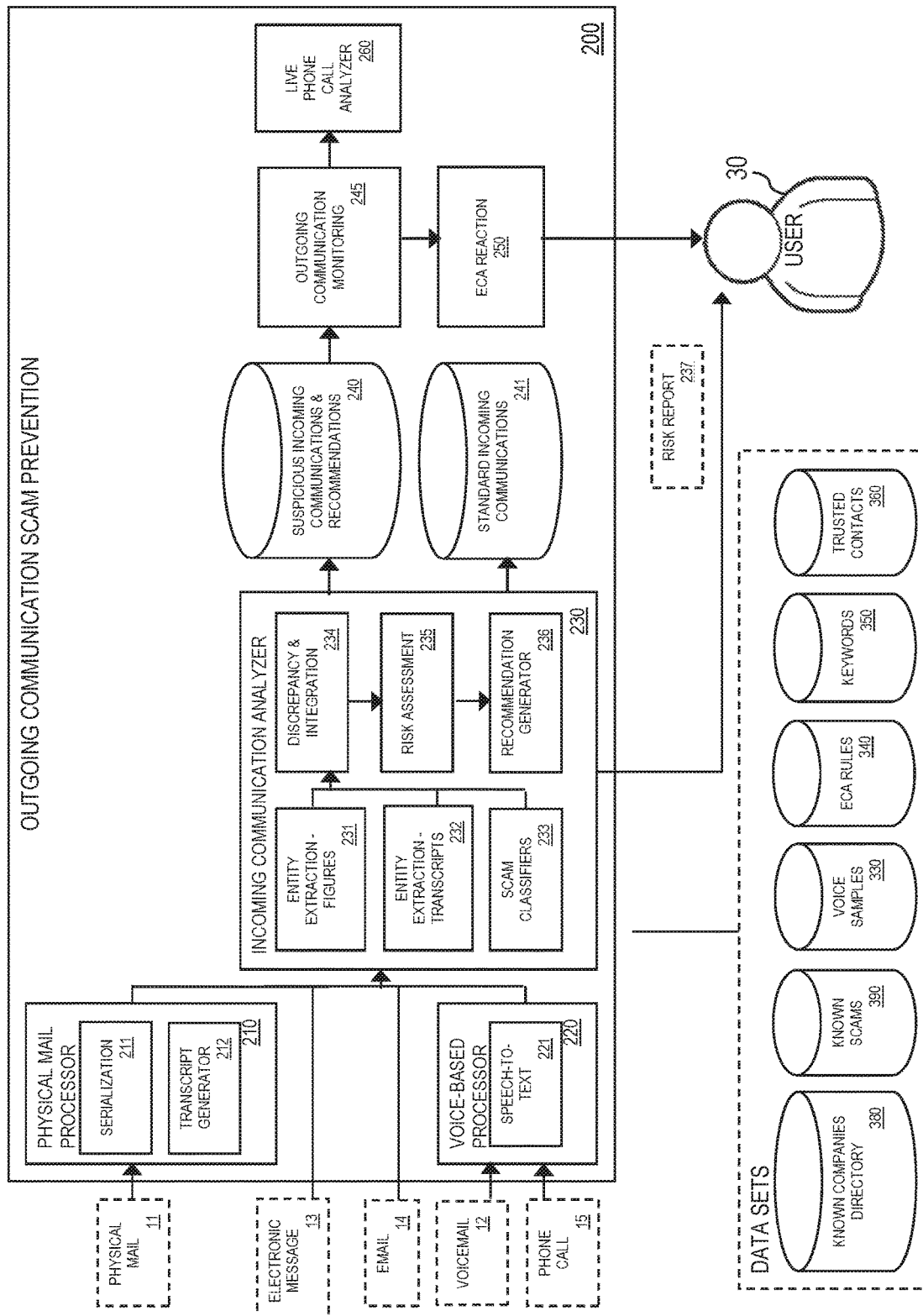
FIG. 2 illustrates an example outgoing communication scam prevention system in detail, in accordance with an embodiment of the invention.

FIG. 2 illustrates an example outgoing communication scam prevention system 200 in detail, in accordance with an embodiment of the invention. The scam prevention system 200 comprises, but is not limited to, the following components: (1) an incoming communication analyzer 230 configured to intercept an incoming communication 10 (FIG. 1) targeting the user 30 and analyze the incoming communication 10 to determine a corresponding risk assessment metric and risk classification for the incoming communication 10 (e.g., standard incoming communication, suspicious incoming communication, etc.), and (2) an outgoing communication monitoring unit 245 configured to monitor outgoing communications from the user 30, and detect when an outgoing communication from the user 30 is linked to an incoming communication 10 classified as suspicious incoming communication (i.e., the outgoing communication is in response to the suspicious incoming communication).

One or more components of the scam prevention system 200 may utilize one or more data sets such as, but not limited to, the following: (1) a first data set 380 maintaining a directory of known companies and business information for the known companies (e.g., for each known company, a corresponding company name, a corresponding business phone number, a corresponding business address, a corresponding company logo, etc.), (2) a second data set 390 maintaining scam information, (3) a third data set 330 maintaining voice samples of trusted persons (i.e., individuals who the user 30 trusts, such as a family member, etc.), (4) a fourth data set 340 maintaining a set of event condition action (ECA) rules, (5) a fifth data set 350 maintaining suspicious keywords commonly associated with social engineering tactics scammers may employ (e.g., instructing the user 30 not to tell anyone, threatening/pressuring/rushing the user 30, etc.), and (6) a sixth data set 360 maintaining trusted contact information (i.e., contact information of trusted persons, such as phone numbers, email addresses, physical addresses, etc.). Each data set may be maintained locally on the device 100 or remotely (e.g., on a remote server).

In one embodiment, the scam information maintained in the data set 390 may comprise at least one of the following: (1) training data comprising information indicative of existing/known scams, unwanted solicitations, benign conversations, and/or social engineering tactics scammers/telemarketers may employ, or (2) signatures of existing/known scams, unwanted solicitations, and social engineering tactics scammers/telemarketers may employ.

In one embodiment, the scam prevention system 200 comprises a physical mail processor 210 configured to process an incoming communication 10 comprising physical mail 11 (e.g., a letter, a postcard, etc.). The physical mail processor 210 comprises, but is not limited to, at least one of the following: (1) a serialization unit 211 configured to scan or apply another serialization scheme to physical mail 11 to convert the physical mail 11 to a digitized copy of the physical mail 11 (e.g., a scanned copy of the physical mail 11 captured via a scanner, a digital photo of the physical mail 11 captured via a camera, etc.), and (2) a transcript generator unit 212 configured to apply a conversion scheme (e.g., optical character recognition, etc.) to the digitized copy to obtain a transcript of text included in the digitized copy. The digitized copy and/or the transcript is forwarded to the incoming communication analyzer 230 for analysis. The physical mail processor 210 may be embodied on the device 100 or on separate equipment (e.g., equipment on the same local network as the device 100, equipment connected to the device 100, etc.).

In one embodiment, the scam prevention system 200 comprises a voice-based processor 220 configured to process an incoming communication 10 comprising a voicemail 12 or a phone call. The voice-based processor 220 is configured to record and store an incoming voicemail 12 or an incoming phone call 15 for the user 30. The voice-based processor 220 comprises a speech-to-text converter 221 configured to invoke/apply a speech-to-text service/process to transcribe a recording of an incoming voicemail 12 or an incoming phone call 15 into a transcript of text. The recording and/or the transcript is forwarded to the incoming communication analyzer 230 for analysis. The voice-based processor 220 may be embodied on the device 100 or on separate equipment (e.g., equipment on the same local network as the device 100, equipment connected to the device 100, etc.).

The incoming communication analyzer 230 is configured to analyze any type of incoming communication 10 targeting the user 30. For example, the incoming communication analyzer 230 is configured to analyze an incoming email 14, an incoming electronic message 13 (e.g., a text message, an electronic chat, an instant message, etc.), a recording and/or a transcript of an incoming voicemail 12, a recording and/or a transcript of an incoming phone call 15, a digitized copy and/or a transcript of incoming physical mail 11, etc.

In one embodiment, the incoming communication analyzer 230 is configured to determine a type of entity an incoming communication 10 originates from. Specifically, the incoming communication analyzer 230 comprises a first entity extraction unit 231 configured to detect an image included in an incoming communication 10 (e.g., an image included in the signature of an incoming email 14, an image included in a letterhead of an incoming physical mail 11, etc.), extract the image, and analyze the image to identify an entity associated with the image. For example, the first entity extraction unit 231 may utilize the data set 380 to determine whether the image matches or is substantially similar to a known logo for an entity (e.g., a company logo for a known company, such as the logo of a popular brand of soft drink, etc.).

The incoming communication analyzer 230 comprises a second entity extraction unit 232 configured to analyze text included in an incoming communication 10 (e.g., text included in a transcript of an incoming voicemail 12, text included in the body of an incoming email 14, etc.) to identify an entity associated with a portion of the text. For example, the second entity extraction unit 232 may utilize the data set 380 to determine whether a portion of the text matches or is substantially similar to known business information for an entity (e.g., business information for a known company, such as a company name, a business address, a business phone address, etc.).

In one embodiment, the incoming communication analyzer 230 comprises one or more scam classifiers 233 configured to detect scams and unwanted solicitations (e.g., unwanted mail solicitations, unwanted phone solicitations, etc.). A scam classifier 233 may be trained (e.g., using machine learning) based on training data comprising information indicative of existing/known scams, unwanted solicitations, benign conversations, and/or social engineering tactics scammers/telemarketers may employ (e.g., training data included in the data set 390). A scam classifier 233 may provide a predicted classification class representing a detected/predicted scam type for the incoming communication 10. In another embodiment, the incoming communication analyzer 230 may compare an incoming communication 10 against signatures of existing/known scams, unwanted solicitations, and social engineering tactics scammers/telemarketers may employ (e.g., signatures included in the data set 390), and provide a predicted classification class representing a detected/predicted scam type for the incoming communication 10. Examples of predicted classification classes include, but are not limited to, the following: none (i.e., the incoming communication 10 does not match known scams and unwanted solicitations), family member scam (e.g., the incoming communication 10 originates from a scammer impersonating a family member of the user 30 and requesting money as he/she is in trouble), tax scam (e.g., the incoming communication 10 originates from a scammer alleging the user 30 will receive a citation or go to jail as the user 30 is behind in taxes), technical support scam (e.g., the incoming communication 10 originates from a scammer alleging he/she is part of technical support and requesting remote access to an external user device 160 of the user 30), foreign lottery scam, fake loan scam, etc.

In one embodiment, for an incoming voicemail 12, a scam classifier 233 may utilize the data set 330 to compare voice patterns included in a recording of the voicemail 12 against voice samples of trusted persons (i.e., individuals who the user 30 trusts, such as a family member, etc.). In one embodiment, a scam classifier 233 may utilize the data set 350 to compare text included in an incoming communication 10 (e.g., text included in a transcript of an incoming voicemail 12, text included in the body of an incoming email 14, etc.) against suspicious keywords commonly associated with social engineering tactics scammers may employ (e.g., instructing the user 30 not to tell anyone, threatening/pressuring/rushing the user 30, etc.).

In one embodiment, a scam classifier 233 may utilize the data set 360 to compare contact information extracted from an incoming communication 10 (e.g., a phone number, an email address, or a physical address the incoming communication 10 originates from, etc.) against trusted contact information (i.e., contact information of trusted persons, such as phone numbers, email addresses, etc.).

In one embodiment, each scam classifier 233 utilizes a learned classification model trained online (i.e., on the device 100) or offline (i.e., not on the device 100). For example, in a training stage, a classification model may be trained on a remote server using machine learning. The classification model is trained based on training data comprising information indicative of existing/known scams, unwanted solicitations, benign conversations, and/or social engineering tactics scammers/telemarketers may employ, and/or signatures of existing/known scams, unwanted solicitations, and/or social engineering tactics scammers/telemarketers may employ (e.g., information maintained in the data set 390). For example, the training data may include official reported scams (e.g., scams reported to a governmental agency, etc.), scams reported on social media platforms by social media users affected by scams, etc. After training, the resulting learned classification model may be loaded onto/downloaded to the device 100 as a portion of the scam prevention system 200 for use in a deployment stage.

In one embodiment, the incoming communication analyzer 230 comprises a discrepancy and integration unit 234 configured to receive at least one of the following analysis/classification results relating to an incoming communication 10: (1) a result of an analysis performed by the first entity extraction unit 231 (e.g., a known logo detected), (2) a result of an analysis performed by the second entity extraction unit 232 (e.g., known business information detected), and (3) a result of a classification performed by a scam classifier 233 (e.g., a detected/predicted scam type for the incoming communication 10). The discrepancy and integration unit 234 determines whether there are any discrepancies in the analysis/classification results received (e.g., if both a known logo and known business information are detected, whether the known logo corresponds to the same entity as the known business information). If there are any discrepancies in the analysis/classification results received, the incoming communication analyzer 230 may investigate the incoming communication 10 further to resolve the discrepancies. If there are no discrepancies in the analysis/classification results received, the discrepancy and integration unit 234 integrates the analysis/classification results received.

In one embodiment, the incoming communication analyzer 230 comprises a risk assessment unit 235 configured to perform a risk assessment for an incoming communication 10. Specifically, the risk assessment unit 235 receives integrated analysis/classification results for the incoming communication 10 from the discrepancy and integration unit 234, computes a risk assessment metric for the incoming communication 10 based on the results received, and determines a risk classification for the incoming communication 10 based on the risk assessment metric. For example, if the risk assessment metric exceeds a pre-determined threshold (e.g., the risk assessment metric is very high as a detected/predicted scam type for the incoming communication 10 is a known scam), the incoming communication 10 may be classified as suspicious incoming communication; otherwise, the incoming communication 10 may be classified as standard incoming communication or another generic category (e.g., personal, medical, etc.).

In one embodiment, the incoming communication analyzer 230 comprises a recommendation generator unit 236 configured to receive a risk assessment metric and/or risk classification for an incoming communication 10 from the risk assessment unit 235, and generate a risk report 237 comprising risk assessment results of a risk assessment performed for the incoming communication 10. The report indicates whether the incoming classification 10 is classified as a scam (i.e., suspicious incoming communication). The report further comprises one or more of the following: (1) follow-up contact information (e.g., phone number, mail address, e-mail address, etc.) for responding to the incoming communication 10, (2) the risk assessment metric and/or the risk classification, (3) a recommendation for the user 30.

In one embodiment, the scam prevention system 200 maintains each incoming communication 10 classified as suspicious incoming communication and a corresponding risk report 237 (including risk assessment results, recommendation, etc.) for the incoming communication 10 in a first database 240 indexed by follow-up contact information. The scam prevention system 200 further maintains each incoming communication 10 classified as standard incoming communication (or a generic category other than suspicious incoming communication) in a second database 241 indexed by follow-up contact information.

In one embodiment, the outgoing communication monitoring unit 245 monitors each outgoing communication prepared/initiated by the user 30 (e.g., an outgoing phone call, an outgoing email, etc.), determines whether the outgoing communication is linked to a previously received incoming communication classified as suspicious incoming communication, and invokes an action relating to scam prevention in response to determining the outgoing communication is linked to suspicious incoming communication. Specifically, the outgoing communication monitoring unit 245 compares contact information for a recipient of the outgoing communication (e.g., an outgoing phone number dialed by the user 30, an outgoing email address typed by the user 30, etc.) against suspicious incoming communications maintained in the first database 240. If the contact information for the recipient matches follow-up contact information for a suspicious incoming communication included in the first database 240 (e.g., a phone number dialed by the user 30 matches a follow-up phone number for an incoming communication classified as suspicious incoming communication), the outgoing communication is linked to the suspicious incoming communication.

In one embodiment, if an outgoing communication is linked to a suspicious incoming communication and the outgoing communication is an outgoing phone call, the outgoing communication monitoring unit 245 transfers contextual information associated with the outgoing phone call (e.g., risk assessment results for the suspicious incoming communication, etc.) to a live phone call analyzer unit 260. The live phone call analyzer unit 260 supports real-time analysis of a conversation between the user 30 and a recipient of the outgoing phone call to detect attributes that indicate phishing, scams, telemarketing, etc. The live phone call analyzer unit 260 may be a component of the scam prevention system 200 or a component of an external system. An embodiment of the live phone call analyzer unit 260 is described in commonly-assigned, co-pending U.S. Non-Provisional Patent Application entitled "CONVERSATION AND CONTEXT AWARE FRAUD AND ABUSE PREVENTION AGENT", filed on the same day as the present application.

In one embodiment, if an outgoing communication is linked to a suspicious incoming communication and the outgoing communication is an outgoing email, an outgoing electronic message (e.g., a text message, an electronic chat, an instant message, etc.), or an outgoing letter, the outgoing communication monitoring unit 245 transfers contextual information associated with the outgoing communication (e.g., risk assessment results for the suspicious incoming communication, etc.) to an ECA reaction unit 250. The ECA reaction unit 250 performs an intervention and/or provides a warning to the user 30 based on a set of ECA rules maintained in the data set 340. Each ECA rule specifies an event, a condition to satisfy if the event occurs, and a set of actions to take if the condition is satisfied (i.e., for performing an intervention). The ECA reaction unit 250 may be a component of the scam prevention system 200 or a component of an external system. An embodiment of the ECA reaction 250 is described in commonly-assigned, co-pending U.S. Non-Provisional Patent Application entitled "CONVERSATION AND CONTEXT AWARE FRAUD AND ABUSE PREVENTION AGENT", filed on the same day as the present application.

For example, the ECA reaction unit 250 may warn the user 30 by reminding the user 30 of a risk report generated for the suspicious incoming communication.

Examples of interventions the ECA reaction unit 250 may perform include, but are not limited to, delaying sending of the outgoing communication, canceling the outgoing communication, informing a third party (e.g., a trusted person of the user 30, such as a family member, a caregiver), triggering a warning to warn the user 30 of risks (e.g., remind the user 30 of a risk report previously generated for an incoming communication 10, flashing a warning light such as a red light on the device 100 and/or an external user device 160, playing a warning sound/song), etc.

In one embodiment, one or more components of the system 200 may reside in a cloud computing environment. In one embodiment, one or more components of the system 200 may reside on one or more server devices. In one embodiment, at least one component of the system 200 may reside in a cloud computing environment, and at least one other component of the system 200 may reside on at least one server device.

Figures 3A, 3B, 4:
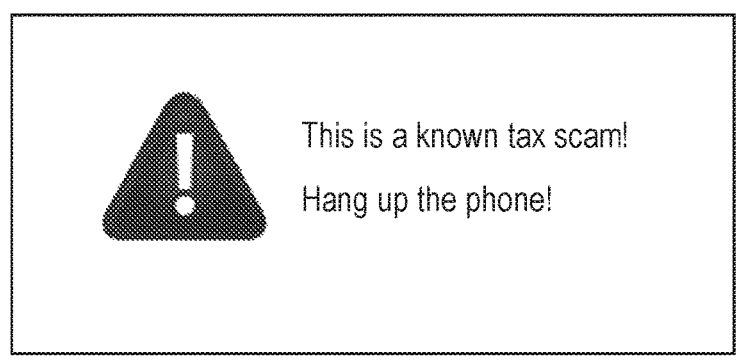
FIG. 3A illustrates one or more example suspicious incoming communications and corresponding risk assessment results, in accordance with an embodiment of the invention.
FIG. 3B illustrates one or more example standard incoming communications, in accordance with an embodiment of the invention.
FIG. 4 illustrates an example warning provided to a user initiating an outgoing phone call in response to a suspicious incoming communication, in accordance with an embodiment of the invention.

FIG. 3A illustrates one or more example suspicious incoming communications and corresponding risk assessment results, in accordance with an embodiment of the invention. In one embodiment, each suspicious incoming communication maintained in the first database 240 is indexed by corresponding follow-up contact information. Risk assessment results for each suspicious incoming communication comprises a corresponding risk assessment metric and a corresponding detected/predicted scam type.

FIG. 3B illustrates one or more example standard incoming communications, in accordance with an embodiment of the invention. In one embodiment, each standard incoming communication maintained in the second database 241 is indexed by corresponding follow-up contact information.

FIG. 4 illustrates an example warning 400 provided to a user 30 initiating an outgoing phone call in response to a suspicious incoming communication, in accordance with an embodiment of the invention. The warning 400 includes a recommended intervention (i.e., hang up the phone) in response to predicting the incoming communication is a tax scam.

Figure 5:
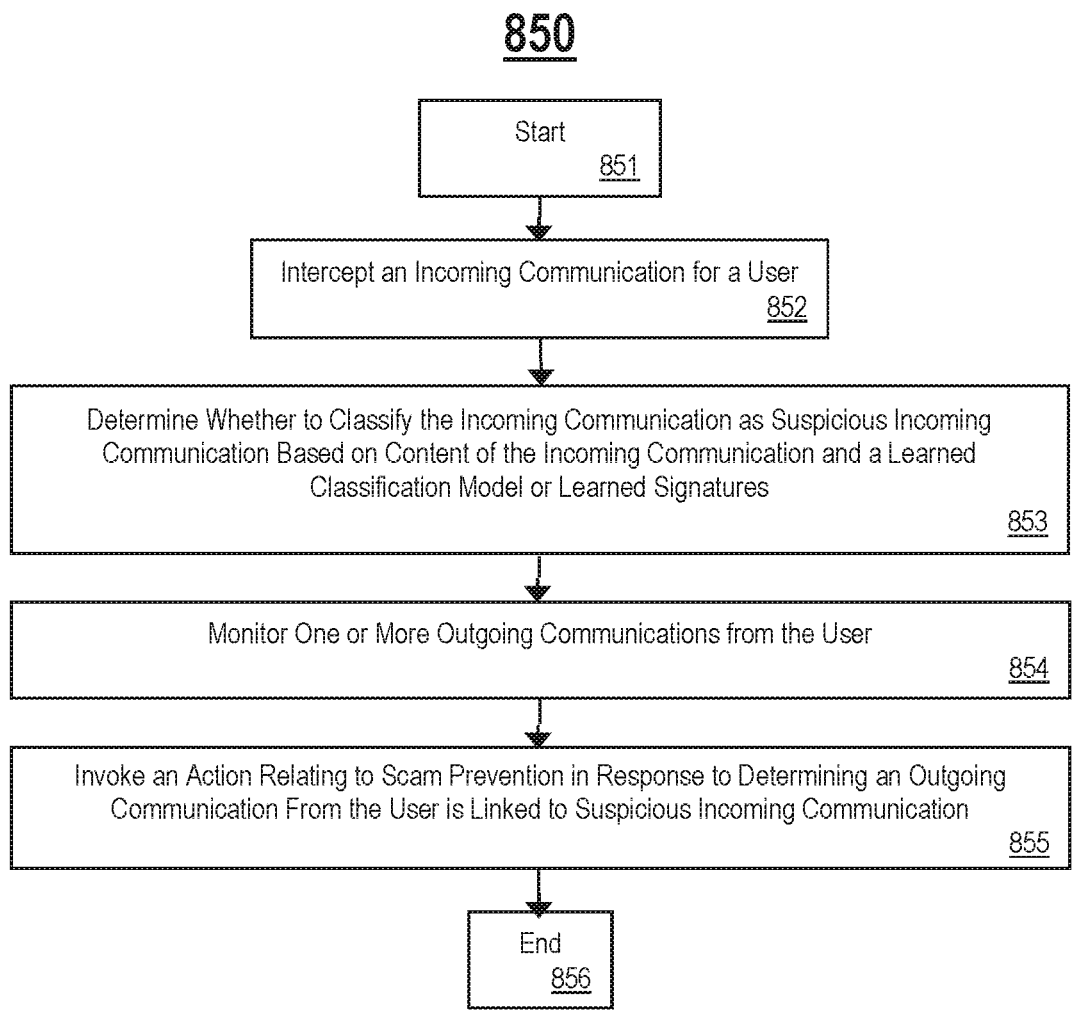
FIG. 5 is a flowchart for an example process for outgoing communication scam prevention, in accordance with an embodiment of the invention.

FIG. 5 is a flowchart for an example process 850 for outgoing communication scam prevention, in accordance with an embodiment of the invention. In process block 851, process 850 starts. In process block 852, intercept an incoming communication for a user. In process block 853, determine whether to classify the incoming communication as a suspicious incoming communication based on content of the incoming communication and a learned classification model or learned signatures.

In process block 854, monitor one or more outgoing communications from the user.

In process block 855, invoke an action relating to scam prevention in response to determining an outgoing communication from the user is linked to a suspicious incoming communication.

In process block 856, the process 850 ends.

In one embodiment, process blocks 851-856 are performed by one or more components of the scam prevention system 200, such as the physical mail processor 210, the voice-based processor 220, the incoming communication analyzer 230, the outgoing communication monitoring unit 245, the ECA reaction unit 250, and the live phone call analyzer unit 260.

Figure 6:
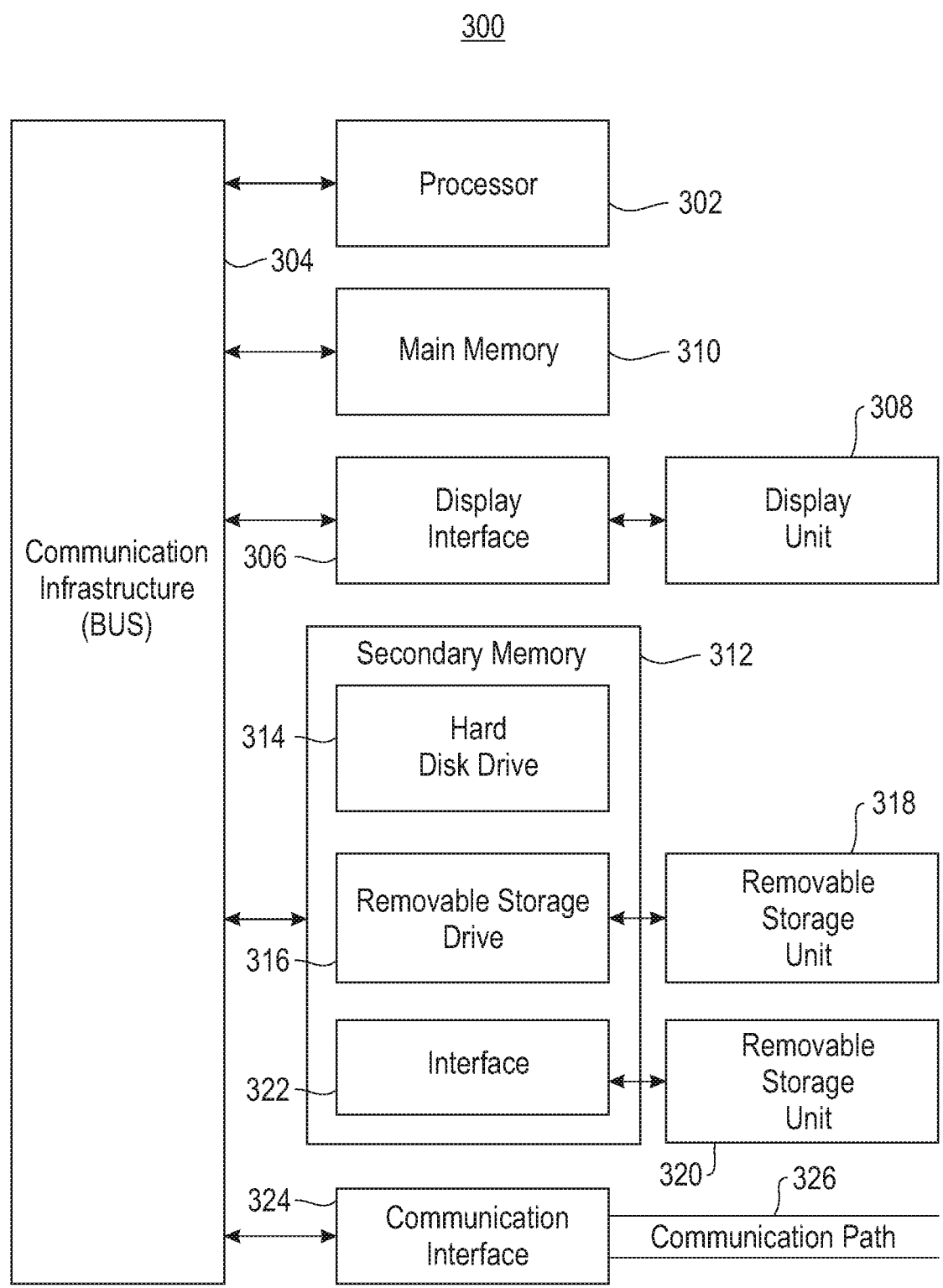
FIG. 6 is a high level block diagram showing an information processing system useful for implementing an embodiment of the present invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   intercepting an incoming communication for a user;
   classifying the incoming communication as a suspicious incoming communication or a standard incoming communication that is not suspicious by:
   determining, via a learned classification model trained using machine learning, a risk assessment metric for the incoming communication based on content of the incoming communication, wherein the risk assessment metric represents a confidence level the incoming communication is predicted as a scam via the learned classified model, and the learned classification model is trained based on training data comprising information indicative of known scams; and
   determining whether the risk assessment metric exceeds a pre-determined threshold, wherein the incoming communication is classified as a suspicious incoming communication in response to determining the risk assessment metric exceeds the pre-determined threshold; and
   in response to classifying the incoming communication as a suspicious incoming communication:
   further classifying the incoming communication with a corresponding classification class indicative of a type of scam that the incoming communication involves and further indicative of an individual or an entity that a scammer from which the incoming communication originates is impersonating;
   generating and providing, to the user for review, a risk report comprising one or more risk assessment results for the incoming communication based on the risk assessment metric and the corresponding classification class;
   monitoring one or more outgoing communications from the user; and
   invoking an action relating to scam prevention in response to determining an outgoing communication from the user is linked to the incoming communication.

2. The method of claim 1, wherein:
   the incoming communication comprises one of an incoming phone call, an incoming voicemail, an incoming electronic message, an incoming email, or a digitized copy of incoming mail; and
   the outgoing communication comprises one of an outgoing phone call, an outgoing electronic message, an outgoing email, or a digitized copy of outgoing mail.

3. The method of claim 1, wherein the incoming communication is classified as a standard incoming communication that is not suspicious in response to determining the risk assessment metric does not exceed the pre-determined threshold.

4. The method of claim 1,
   wherein the risk report comprises follow-up contact information for responding to the incoming communication, the risk assessment metric, and a recommendation.

5. The method of claim 4, further comprising:
   in response to classifying the incoming communication as a suspicious incoming communication, storing the incoming communication and the risk report in a database indexed by the follow-up contact information for responding to the incoming communication.

6. The method of claim 1, wherein:
   the training data further comprises information indicative of at least one of the following: unwanted solicitations, benign conversations, or social engineering tactics scammers employ.

7. The method of claim 5, wherein invoking an action relating to scam prevention in response to determining an outgoing communication from the user is linked to the incoming communication comprises:
   determining whether contact information for the outgoing communication matches the follow-up contact information for responding to the incoming communication; and
   in response to determining the contact information for the outgoing communication matches the follow-up contact information for responding to the incoming communication, reminding the user of the risk report.

8. The method of claim 1, wherein invoking an action relating to scam prevention comprises:
   if the outgoing communication comprises an outgoing phone call, invoking a real-time analysis of a conversation between the user and a recipient of an outgoing phone call to detect attributes that indicate phishing, scams, or telemarketing.

9. The method of claim 1, wherein invoking an action relating to scam prevention comprises:
   if the outgoing communication comprises one of an outgoing email, an outgoing electronic message, or a digitized copy of outgoing mail, performing an intervention or providing a warning to the user based on a set of rules.

10. The method of claim 9, wherein the intervention comprises at least one of: delaying the outgoing communication, triggering a warning to warn the user of risks, informing a third party, or canceling the outgoing communication.

11. The method of claim 2, further comprising:
if the incoming communication comprises an incoming voicemail, obtaining a transcript of the voicemail.

12. The method of claim 2, wherein the digitized copy of incoming mail is obtained via one of a scanner or a camera.

13. The method of claim 2, further comprising:
extracting an image from the incoming communication, and determining whether the image is substantially similar to a company logo for a known company.

14. A system comprising:
at least one processor; and
a non-transitory processor-readable memory device storing instructions that when executed by the at least one processor causes the at least one processor to perform operations including:
intercepting an incoming communication for a user;
classifying the incoming communication as a suspicious incoming communication or a standard incoming communication that is not suspicious by:
determining, via a learned classification model trained using machine learning, a risk assessment metric for the incoming communication based on content of the incoming communication, wherein the risk assessment metric represents a confidence level the incoming communication is predicted as a scam via the learned classified model, and the learned classification model is trained based on training data comprising information indicative of known scams; and
determining whether the risk assessment metric exceeds a pre-determined threshold, wherein the incoming communication is classified as a suspicious incoming communication in response to determining the risk assessment metric exceeds the pre-determined threshold; and
in response to classifying the incoming communication as a suspicious incoming communication:
further classifying the incoming communication with a corresponding classification class indicative of a type of scam that the incoming communication involves and further indicative of an individual or an entity that a scammer from which the incoming communication originates is impersonating;
generating and providing, to the user for review, a risk report comprising one or more risk assessment results for the incoming communication based on the risk assessment metric and the corresponding classification class;
monitoring one or more outgoing communications from the user; and
invoking an action relating to scam prevention in response to determining an outgoing communication from the user is linked to the incoming communication.

15. The system of claim 14, wherein:
the incoming communication comprises one of an incoming phone call, an incoming voicemail, an incoming electronic message, an incoming email, or a digitized copy of incoming mail; and
the outgoing communication comprises one of an outgoing phone call, an outgoing electronic message, an outgoing email, or a digitized copy of outgoing mail.

16. The system of claim 14, wherein the incoming communication is classified as a standard incoming communication that is not suspicious in response to determining the risk assessment metric does not exceed the pre-determined threshold.

17. The system of claim 14,
wherein the risk report comprises follow-up contact information for responding to the incoming communication, the risk assessment metric, and a recommendation.

18. The system of claim 14, wherein:
the training data further comprises information indicative of at least one of the following: unwanted solicitations, benign conversations, or social engineering tactics scammers employ.

19. The system of claim 14, wherein invoking an action relating to scam prevention comprises:
if the outgoing communication comprises an outgoing phone call, invoking a real-time analysis of a conversation between the user and a recipient of an outgoing phone call to detect attributes that indicate phishing, scams, or telemarketing; and
if the outgoing communication comprises one of an outgoing email, an outgoing electronic message, or a digitized copy of outgoing mail, performing an intervention or providing a warning to the user based on a set of rules.

20. A computer program product comprising a computer-readable hardware storage medium having program code embodied therewith, the program code being executable by a computer to implement a method comprising:
intercepting an incoming communication for a user;
classifying the incoming communication as a suspicious incoming communication or a standard incoming communication that is not suspicious by:
determining, via a learned classification model trained using machine learning, a risk assessment metric for the incoming communication based on content of the incoming communication, wherein the risk assessment metric represents a confidence level the incoming communication is predicted as a scam via the learned classified model, and the learned classification model is trained based on training data comprising information indicative of known scams; and
determining whether the risk assessment metric exceeds a pre-determined threshold, wherein the incoming communication is classified as a suspicious incoming communication in response to determining the risk assessment metric exceeds the pre-determined threshold; and
in response to classifying the incoming communication as a suspicious incoming communication:
further classifying the incoming communication with a corresponding classification class indicative of a type of scam that the incoming communication involves and further indicative of an individual or an entity that a scammer from which the incoming communication originates is impersonating;
generating and providing, to the user for review, a risk report comprising one or more risk assessment results for the incoming communication based on the risk assessment metric and the corresponding classification class;

monitoring one or more outgoing communications from the user; and invoking an action relating to scam prevention in response to determining an outgoing communication from the user is linked to the incoming communication.

\* \* \* \* \*